United States Patent
Tanabe (10) Patent No.: US 7,480,353 B2
(45) Date of Patent: Jan. 20, 2009

(54) METHOD AND APPARATUS FOR ESTIMATING CHANNEL RESPONSE AND RECEIVER APPARATUS USING THE ESTIMATED CHANNEL RESPONSE FOR OFDM RADIO COMMUNICATION SYSTEMS

(75) Inventor: Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

(21) Appl. No.: 11/009,066

(22) Filed: Dec. 13, 2004

(65) Prior Publication Data

US 2005/0141649 A1    Jun. 30, 2005

(30) Foreign Application Priority Data

Dec. 26, 2003    (JP) ............................... 2003-433640

(51) Int. Cl.
*H04L 27/06* (2006.01)

(52) U.S. Cl. ...................... 375/340; 370/341; 370/342; 370/343; 370/345; 370/203; 370/210; 370/260; 714/708; 714/795; 375/259; 375/224; 375/295

(58) Field of Classification Search .................. 375/340
See application file for complete search history.

(56) References Cited

U.S. PATENT DOCUMENTS 7,145,940 B2 * 12/2006 Gore et al. ................... 375/147
7,151,948 B2 * 12/2006 Ishii et al. ................... 455/522
2003/0108117 A1 * 6/2003 Ketchum et al. ............ 375/295
2004/0131011 A1 7/2004 Sandell et al.

OTHER PUBLICATIONS

Che-Ho Wei, "channel estimation for OFDM system based on Comb-type pilot arrangment in frequency selective fading channels", IEEE transactions on cosumer electronics, vol. 44, No. 1, Feb. 1998.*

* cited by examiner

*Primary Examiner*—Shuwang Liu
*Assistant Examiner*—Dhaval Patel
(74) *Attorney, Agent, or Firm*—Oblon, Spivak, McClelland, Maier & Neustadt, P.C.

(57) ABSTRACT

An estimation apparatus for estimating a channel response of a radio propagation path using a received signal including a first known signal, comprises a generator which generates a reference signal matrix, a calculator which calculates a generalized inverse matrix of the reference signal matrix including singular values which exceed a preset threshold value, an estimation unit configured to estimate an impulse response of the radio channel modeled using a transversal filter based on the first known signal and the generalized inverse matrix, and a converter which converts the estimated impulse response into a frequency-domain signal to acquire a frequency transfer function of the channel.

9 Claims, 7 Drawing Sheets

METHOD AND APPARATUS FOR ESTIMATING CHANNEL RESPONSE AND RECEIVER APPARATUS USING THE ESTIMATED CHANNEL RESPONSE FOR OFDM RADIO COMMUNICATION SYSTEMS

CROSS-REFERENCE TO RELATED APPLICATIONS

This application is based upon and claims the benefit of priority from prior Japanese Patent Application No. 2003-433640, filed Dec. 26, 2003, the entire contents of which are incorporated herein by reference.

BACKGROUND OF THE INVENTION

1. Field of the Invention

The present invention relates to a channel response estimation apparatus for estimating a channel response in an OFDM radio communication system, and a receiving device using the channel response estimation apparatus.

2. Description of the Related Art

In high speed radio communication systems, compensation for signal waveform distortion due to multipath delay waves has become indispensable. As a modulation scheme for use in radio communication, orthogonal frequency division multiplexing (OFDM) is known which utilizes a plurality of carriers and each carrier is orthogonal to others (called sub-carriers).

In OFDM, inter-symbol interference can be avoided by converting an OFDM signal into a cyclic signal using guard intervals. This prevents signal waveform distortion due to multipath delay waves, without an equalizer. In an environment in which signal waveform distortion occurs because of multipath delay waves, subcarriers of an OFDM signal are received with different gains and phases. To demodulate OFDM signal in such environment, it is necessary to estimate the frequency transfer function of the channel and perform demodulation based on the estimation result.

In OFDM, in general, a predetermined known signal, which is already known to a transmission side and reception side, hereinafter called "known signal" is transmitted to estimate the frequency transfer function of a channel. In a method in which known signals are carried by all subcarriers in each OFDM symbol, it is not necessary to perform frequency-domain interpolation, which is effective when the range of variations with time in the response of the channel is small. Further, a scheme is well known in which the impulse response of a channel is estimated from such a known signal, and the estimated impulse response is subjected to Fourier transform, thereby estimating the frequency transfer function of the channel.

Estimation of an impulse response is realized by, for example, modeling a channel using a transversal filter model, and estimating the tap coefficient of the filter. Jpn. Pat. Appln. KOKAI Publication No. 2003-124857 (document 1) discloses a method for estimating an impulse response using the least-square method. Jpn. Pat. Appln. KOKAI Publication No. 2003-32217 (document 2) discloses a method for estimating an impulse response using the mean square error method.

In OFDM, in general, to reduce the interference between adjacent channels, several subcarriers located at the both edges of whole frequency band of an OFDM signal cannot be used for communication. This degrades the time-domain resolution. Accordingly, the method proposed by document 1 cannot separate delay waves that reach adjacent taps. In the method proposed by document 2, the estimation performance is significantly influenced by the initial value of the reverse matrix of a correlation matrix used in the recursive least square (RLS) method.

BRIEF SUMMARY OF THE INVENTION

It is an object of the invention to provide a channel response estimation apparatus capable of estimating, with high accuracy, a frequency transfer function as a channel response even if several subcarriers located at the both edges of whole frequency band of an OFDM signal cannot be used, and to provide a radio receiving device utilizing the estimation apparatus.

In accordance with an aspect of the invention, there is provide an apparatus for estimating a channel response of a radio propagation path using a received signal including a first known signal, comprises a generator which generates a reference signal matrix, a calculator which calculates a generalized inverse matrix of the reference signal matrix including singular values which exceed a preset threshold value, an estimation unit configured to estimate an impulse response of the radio channel modeled using a transversal filter based on the first known signal and the generalized inverse matrix, and a converter which converts the estimated impulse response into a frequency-domain signal to acquire a frequency transfer function of the channel.

DETAILED DESCRIPTION OF THE INVENTION

Embodiments of the invention will be described in detail with reference to the accompanying drawings.

First Embodiment

Figure 1:
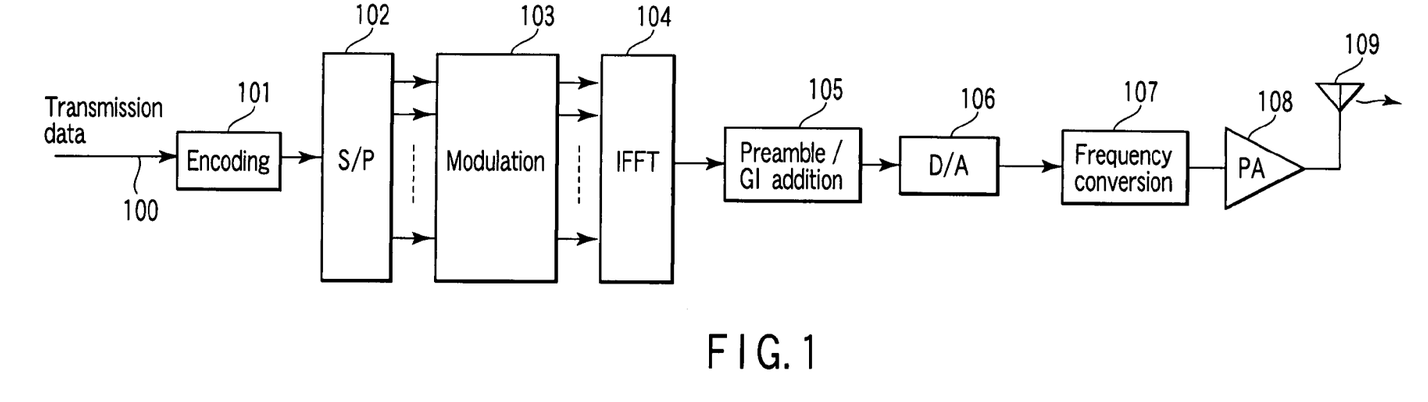
FIG. 1 is a block diagram illustrating an OFDM transmitter according to a first embodiment of the invention.
Figure 2:
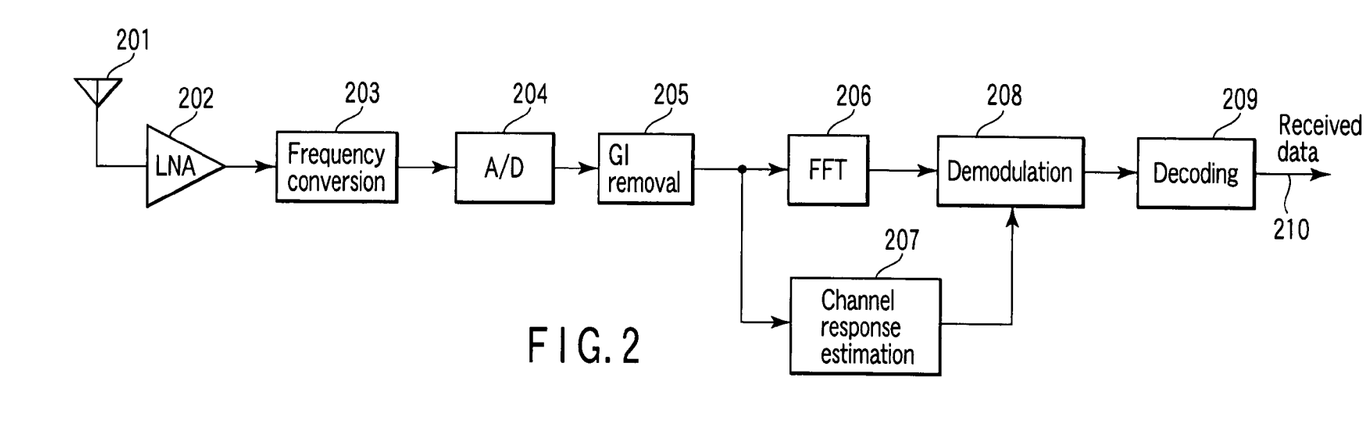
FIG. 2 is a block diagram illustrating an OFDM receiver according to the first embodiment of the invention.

Referring first to FIGS. 1 and 2, an OFDM radio communication system according to the present invention will be described. As seen from FIG. 1, in an OFDM transmitter included in the system, an encoder 101 subjects transmission data 100 to error correction encoding. The resultant encoded data is sent to a serial/parallel (S/P) converter 102, where it is divided into signals corresponding to the respective subcarriers of an OFDM signal. The resultant signals are input to a modulator 103, where they are subjected to digital modulation such as binary phase shift keying (BPSK).

The modulated signals are sent to an inverse fast Fourier transformer (IFFT) 104, where they are transformed into a time-domain signal by inverse fast Fourier transform. The output signal of the inverse fast Fourier transformer 104 is sent to a preamble/GI adder 105, where a preamble signal and guard interval (GI) are added to the signal. After that, the resultant signal is sent to a digital-to-analog (D/A) converter 106, where it is converted into an analog signal.

The output signal of the D/A converter 106 is up-converted into a radio frequency (RF) band by a frequency converter 107, and then sent to a transmission antenna 109 via a power amplifier 108. As a result, an OFDM signal is emitted as a radio wave from the transmission antenna 109.

On the other hand, as seen from FIG. 2, in an OFDM receiver, an OFDM signal of an RF band received by a receiving antenna 201 is input to a low noise amplifier (LNA) 202, where it is amplified to a predetermined level. The output signal of the low noise amplifier 202 is down-converted into a baseband frequency by a frequency converter 203.

The output signal of the frequency converter 203 is sent to an analog-to-digital (A/D) converter 204, where it is converted into a digital signal. A GI remover 205 removes a guard interval from the digital signal. The resultant signal is sent to a fast Fourier transformer (FFT) 206 and channel response estimation unit 207.

The fast Fourier transformer 206 divides the input digital signal (i.e., time-domain signal) into signals corresponding to respective subcarriers. The channel response estimation unit 207 estimates the frequency transfer function of a channel (the channel between the OFDM transmitter and receiver), as will be described later.

The output signal of the fast Fourier transformer 206 is input to a demodulator 208, where the amplitude and phase of the signal are corrected using the frequency transfer function estimated by the channel response estimation unit 207, and then the resultant signal is demodulated by synchronous detection. A decoder 209 decodes the output signal of the demodulator 208, thereby generating received data 210.

Figure 3:
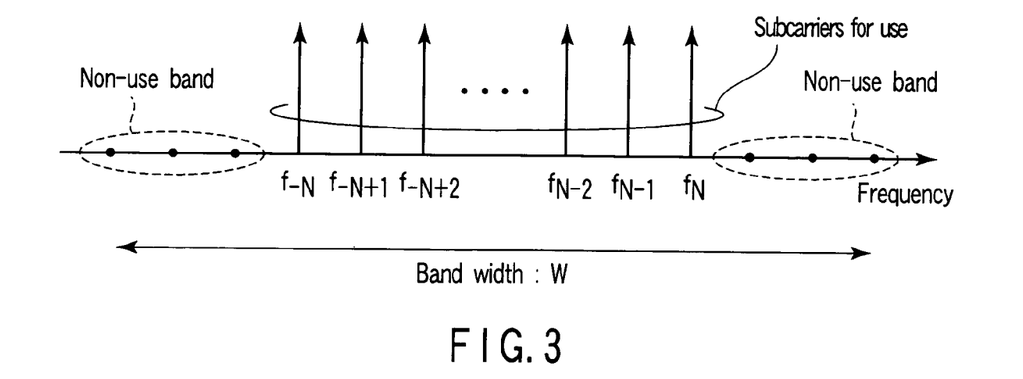
FIG. 3 is a view illustrating the frequency map of an OFDM signal.
Figure 4:
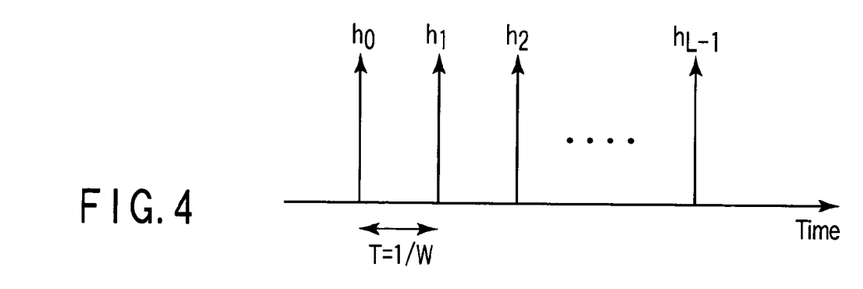
FIG. 4 is a view illustrating a channel model between the OFDM transmitter and receiver.

In general, in the above-described OFDM radio communication system, communication is performed without using some subcarriers located at the both edges of whole band of an OFDM signal, as shown in FIG. 3, in consideration of interference by adjacent carriers or the frequency distortion occurred in a receiver or a transmitter. In the OFDM transmitter shown in FIG. 1, the inverse fast Fourier converter 104 performs inverse fast Fourier transform so that the subcarriers for carrying signals will be orthogonal to each other, thereby generating an OFDM signal in the form of a time-domain signal. Assuming that the frequency band width of the OFDM signal is W, the sampling interval T of a time-domain signal acquired by inverse fast Fourier transform is 1/W as shown in FIG. 4.

In the OFDM receiver shown in FIG. 2, the fast Fourier transformer 206 performs fast Fourier transform on a received OFDM signal sampled at regular intervals of T. As a result, the OFDM signal, which comprises a plurality of signals multiplexed using subcarriers, is divided into signals. The resultant signals are demodulated by the demodulator 208.

To correctly demodulate the signals, carried by the subcarriers, by the demodulator 208 using synchronous detection, it is indispensable to estimate the frequency transfer function of the channel. To this end, it is necessary for the channel response estimation unit 207 to estimate the channel response of each subcarrier. Estimation of the channel responses of all subcarriers is equivalent to the estimation of the frequency transfer function of the channel.

Figure 5:
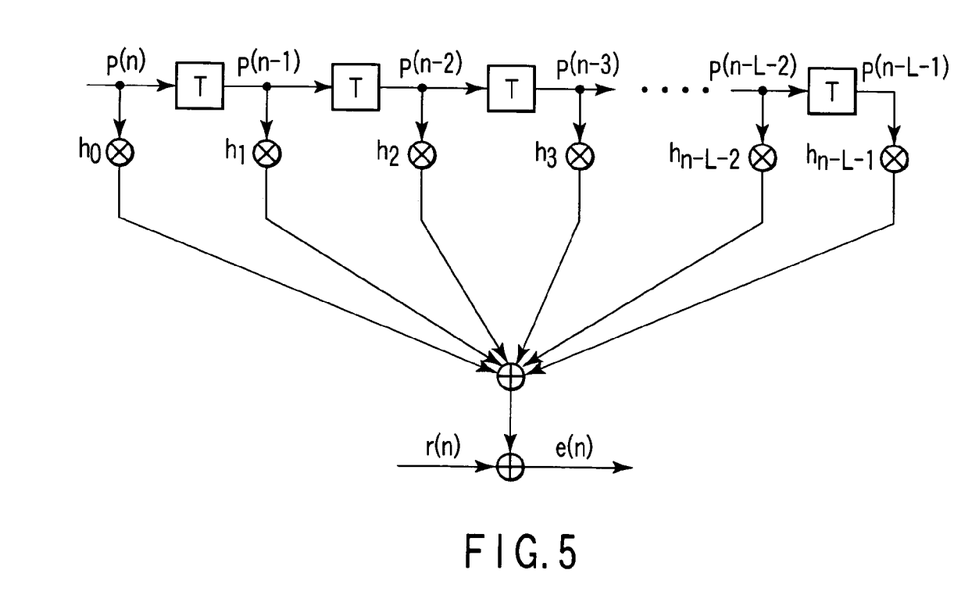
FIG. 5 is a view useful in explaining the principle of the estimation of a channel response using the least square method.

It is generally known that the frequency transfer function of a linear system is acquired by computing the Fourier transform of the impulse response of the system. Accordingly, the impulse response is estimated by acquiring an approximate channel using a transversal filter model with a tap terminal T as shown in FIG. 5. The estimated impulse response is subjected to discrete Fourier transform, thereby estimating the frequency transfer function.

Specifically, an OFDM transmitter transmits, at predetermined timing, an predetermined OFDM signal (the known signal for channel response estimation) including symbols known to an OFDM receiver. The OFDM receiver uses the transmitted signal to optimize the tap coefficient of the transversal filter as shown in FIG. 5 by the least square method (hereinafter referred to as "the LS method") or the minimum mean square error method (hereinafter referred to as "the MMSE method"), thereby acquiring the impulse response of the channel.

The channel response estimation unit 207 according to the first embodiment employs a method for acquiring the impulse response using the LS method. As seen from FIG. 6, the OFDM signal of the RF band received by an antenna 1 is input to a receiving unit 2. The receiving unit 2 performs processes such as amplification, frequency conversion, A/D conversion, etc. The antenna 1 in FIG. 6 corresponds to the antenna 201 shown in FIG. 2. The receiving unit 2 in FIG. 6 corresponds to the low noise amplifier 202, frequency converter 203, A/D converter 204 and GI remover 205.

Figure 6:
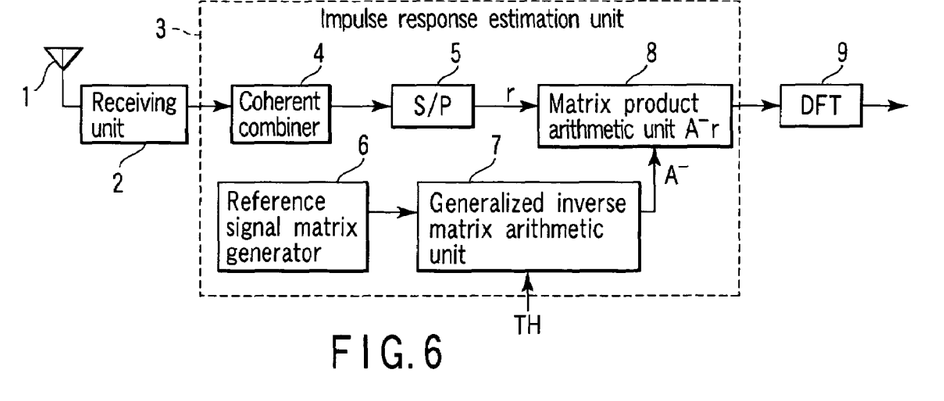
FIG. 6 is a block diagram illustrating a channel response estimation unit according to the first embodiment of the invention.

The signal output from the receiving unit 2 is input to an impulse response estimation unit 3 included in the channel response estimation unit 207 shown in FIG. 2. The impulse response estimation unit 3 estimates the impulse response, using the aforementioned known signal for channel response estimation that is transmitted from the transmitter within a predetermined field. The impulse response estimation unit 3 comprises an coherent combiner 4, serial/parallel converter 5, reference signal matrix generator 6, generalized inverse matrix arithmetic unit 7 and matrix product arithmetic unit 8.

The coherent combiner 4 performs coherent combining on a received known signal for channel response estimation, when necessary. The serial/parallel converter 5 converts the output signal of the coherent combiner 4 into a parallel signal. The reference signal matrix generator 6 generates a reference signal matrix in accordance with the known signal for channel response estimation prepared in the OFDM receiver. The known signal for channel response estimation (first known signal) used in the reference signal matrix generator 6 is originally identical to the known signal for channel response estimation (second known signal) transmitted from the OFDM transmitter. However, if a known signal influenced by the channel response has been received, the received known signal differs from the known signal used in the reference signal matrix generator 6.

The generalized inverse matrix arithmetic unit 7 performs an arithmetic operation for acquiring the generalized inverse matrix of a reference signal matrix generated by the reference signal matrix generator 6. The generalized inverse matrix arithmetic unit 7 will be described later in detail. The matrix product arithmetic unit 8 acquires the product of the signal output from the serial/parallel converter 5 and the generalized inverse matrix generated by the generalized inverse matrix arithmetic unit 7, thereby generating an impulse response. The thus-generated impulse response is the output of the impulse response estimation unit 3.

The impulse response estimated by the impulse response estimation unit 3 is converted into a frequency-domain signal by a frequency-domain signal converter 9, thereby acquiring a frequency transfer function. Thus, the channel response estimation unit 207 shown in FIG. 2 is realized by the impulse response estimation unit 3 and frequency-domain signal converter 9.

Figure 7:
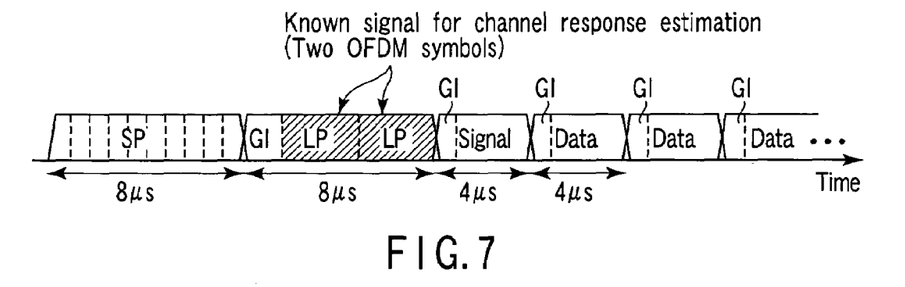
FIG. 7 is a view illustrating a transmission format example employed in the OFDM transmitter.

FIG. 7 shows a frame format example defined by a wireless LAN standard, i.e., IEEE 802.11a. According to this format, firstly, a plurality of short preambles SP used for frame timing synchronization, frequency synchronization and auto gain control (AGC). Subsequently, the above-mentioned known signal for channel response estimation is transmitted. In the example of FIG. 7, a plurality of OFDM symbols called long preambles LP are used as the known signal for channel response estimation.

In FIG. 6, if the known signal for channel response estimation comprises only a single OFDM symbol, the coherent combiner 4 does nothing on the known signal. When the known signal for channel response estimation comprises a plurality of OFDM symbols as shown in FIG. 7, the adder 4 performs coherent combining on the known signal to generate an OFDM received signal of one symbol length. At this time, if two symbols whose type are the same are transmitted as shown in FIG. 7, the adder 4 outputs the following received signal r(n):

$$r(n)=r'(n)+r'(n+M) \quad (1)$$

where r' (n) represents a received signal component acquired by $n^{th}$ sampling in LP, M represents an FFT size used in OFDM. The resistance against noise can be enhanced by thus transmitting, from the OFDM transmitter, a known signal for channel response estimation, which comprises a plurality of OFDM symbols, and performing the coherent combining on the transmitted known signal in the OFDM receiver.

Subsequently, the impulse response is estimated by applying the LS method to the received signal r(n) output from the coherent combiner 4. If the channel is modeled using a transversal filter model as shown in FIG. 5, the received signal r(n) can be given by $$r(n) = \sum_{i=0}^{L-1} h_i \cdot p(n-i) \quad (2)$$

where $h_i$ represents the channel response of the $i^{th}$ path, p(n) the $n^{th}$ sample signal of a to-be-received known signal for channel response estimation, and L the number of paths included in the channel model.

The serial/parallel converter 5 can generate a received signal r expressed in vectors as below by converting, into a parallel signal, each OFDM symbol of the received signal r(n) output from the coherent combiner 4.

$$r = Ah + n \quad (3)$$
$$r = [r(0), r(1), r(2), \ldots, r(M-1)]^T$$
$$h = [h_0, h_1, h_2, \ldots, h_{L-1}]^T \quad (4)$$
$$A = \begin{bmatrix} p(0) & p(M-1) & \cdots & p(M-L+1) \\ p(1) & p(0) & & p(M-L+2) \\ \vdots & \vdots & \ddots & \vdots \\ p(M-1) & p(M-2) & & p(M-L) \end{bmatrix}$$

where T denotes transpose, and A represents a reference signal matrix generated by the reference signal matrix generator 6, the reference signal matrix being formed of a matrix of first known signals for estimation of the channel response. Further, h represents the impulse response of the channel, and n a noise component (in particular, thermal noise. The impulse response h can be estimated as expressed in the following equation, using the least minimum method:

$$h=(A^HA)^{-1}A^Hr \quad (5)$$

In equation (5), $(A^HA)^{-1}A^H$ is called a generalized inverse matrix of matrix A, corresponding to the inverse matrix of a square matrix, and H denotes complex conjugate transpose.

The calculation of equation (5) is performed by the matrix product arithmetic unit 8. However, in the OFDM radio communication system assumed in the embodiment, the reference signal matrix A is ill conditioned since the number of subcarriers usable for communication is limited. This can be confirmed by singular value decomposition. Singular value decomposition is a scheme in which a target matrix is expressed in the orthogonal direct sum of a plurality of spaces, singular vectors indicate the basis vectors of each space, and singular values indicate the components of each space. If the reference signal matrix A is subjected to singular value decomposition, the following equation is established:

$$A = \sum_{i=1}^{L} \lambda_i \cdot w_i v_i^H \quad (6)$$

where λi represents each singular value of the reference signal matrix A, and $w_i$ and $v_i$ represent M-dimensional singular vectors and L-dimensional singular vectors, respectively. In this case, the generalized inverse matrix $(A^HA)^{-1}A^H$ of the reference signal matrix A is given by $$(A^HA)^{-1}A^H = \sum_{i=1}^{L} \frac{1}{\lambda_i} \cdot v_i w_i^H \quad (7)$$

It is understood from the above that if a certain singular value λi is much lower than the other singular values $\lambda_j$, a noise component may well be amplified into very high levels when channel response estimation is performed.

Figure 8:
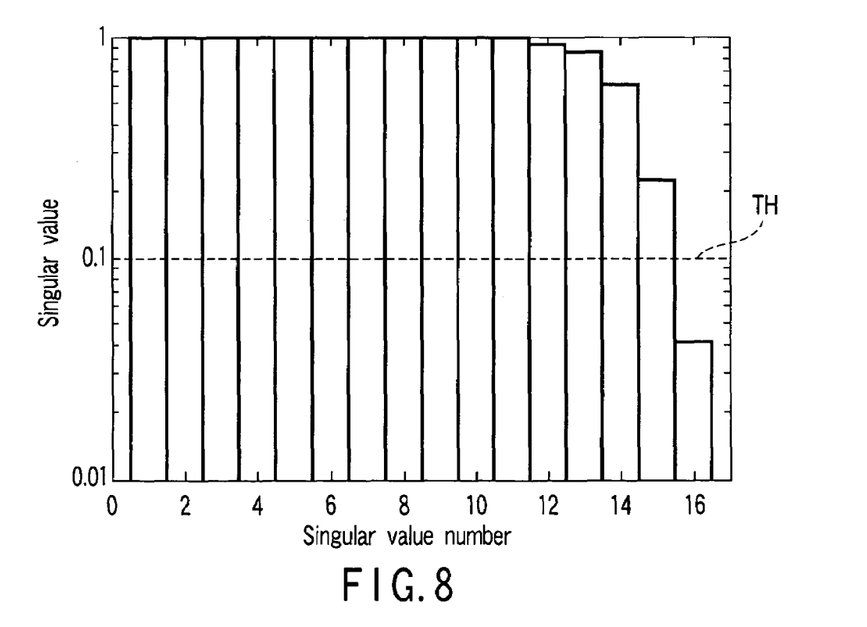
FIG. 8 is a view illustrating a distribution example of singular values of a reference signal matrix.

FIG. 8 shows the singular value distribution of a reference signal matrix acquired, for example, when the number M of the subcarriers of an OFDM signal is 64, and the number of usable subcarriers is 52. In this case, however, the number L of the paths of a channel model is set to 16. In FIG. 8, the abscissa indicates numbers assigned to the singular values of a matrix, beginning from the highest value, while the ordinate indicates the singular values. It is understood from FIG. 8 that the sixteenth singular value as the lowest value is about 1/30 the singular values as the highest values. As a result, the noise component is amplified and the estimation accuracy of the impulse response his inevitably degraded.

To avoid this, in the embodiment, when the reference signal matrix generator 6 generates the reference signal matrix A, and the generalized inverse matrix arithmetic unit 7 calculates the generalized inverse matrix $(A^H A)^{-1} A^H$, the following approximation is performed without using such a low singular value as amplifies a noise component, i.e., a lower singular value than the preset threshold value TH as shown in FIG. 6 (the sixteenth singular value in the example of FIG. 6):

$$(A^H A)^{-1} A^H = \sum_{i=1}^{L-k} \frac{1}{\lambda_i} \cdot v_i w_i^H \quad (8)$$

In the equation (8), k is a positive integer higher than 0 and lower than L. In the example of FIG. 8, k=1. If the inverse of such a low singular value is not used, degradation of impulse response estimation due to the noise enhancement is reduced.

The thus estimated impulse response is subjected to frequency-domain conversion by the frequency-domain converter 9, e.g., to discrete Fourier transform (DFT), thereby estimating the frequency transfer function. The frequency-domain converter 9 may employ FFT instead of DFT, if M is $2^n$. In other words, it is sufficient if the frequency-domain converter 9 performs conversion that enables a transfer function including a desired frequency component to be estimated from the estimated impulse response. Thus, the manner of conversion is not limited.

As described above, the embodiment enables an OFDM communication system, which cannot use some subcarriers of an OFDM signal, to prevent degradation of impulse response estimation accuracy, and enables the frequency transfer function of the channel to be estimated with high accuracy.

Second Embodiment

Figure 9:
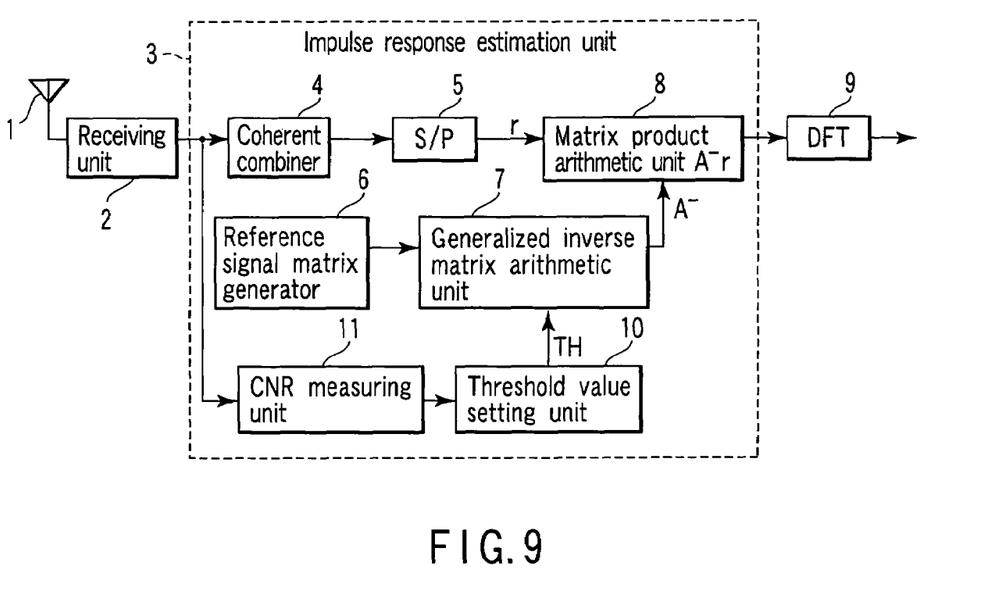
FIG. 9 is a block diagram illustrating a channel response estimation unit according to a second embodiment of the invention.

As shown in FIG. 9, a second embodiment of the invention employs a threshold value setting unit 10 and CNR measuring unit 11 in addition to the channel response estimation unit shown in FIG. 6. The CNR measuring unit 11 measures the carrier-to noise ratio (CNR) of a received signal output from the receiving unit 2. Since a known method is utilized to measure the CNR, no detailed description will be given of the CNR measurement. The measured CNR is sent to the threshold value setting unit 10, which sets threshold value TH used in the generalized inverse matrix arithmetic unit 7, based on the measure CNR.

As described previously, degradation of the estimation accuracy of the transfer function can be prevented by acquiring a generalized inverse matrix, instead of using singular values not higher than threshold value TH, and singular vectors corresponding to the singular values. The optimal threshold value TH depends upon CNR. For instance, if threshold value TH is set too much low, the advantage of avoiding the noise enhancement. On the other hand, if threshold value TH is set too much high, distortion of a signal component is increased, therefore the estimation accuracy is degraded, although the noise enhancement is reduced.

In light of this, threshold value TH set by the threshold value setting unit 10 is not fixed but is made to be able to be varied by the CNR measuring unit 11 in accordance with CNR. Specifically, even if the level of noise is high, the noise enhancement can be reduced by increasing threshold value TH as CNR degrades. In this case, since TH is increased as CNR degrades, distortion of a signal component is avoided, thereby maintaining high estimation accuracy. Thus, in accordance with CNR, threshold value TH can be varied to an optimal value for the state of the channel.

Third Embodiment

Figure 10:
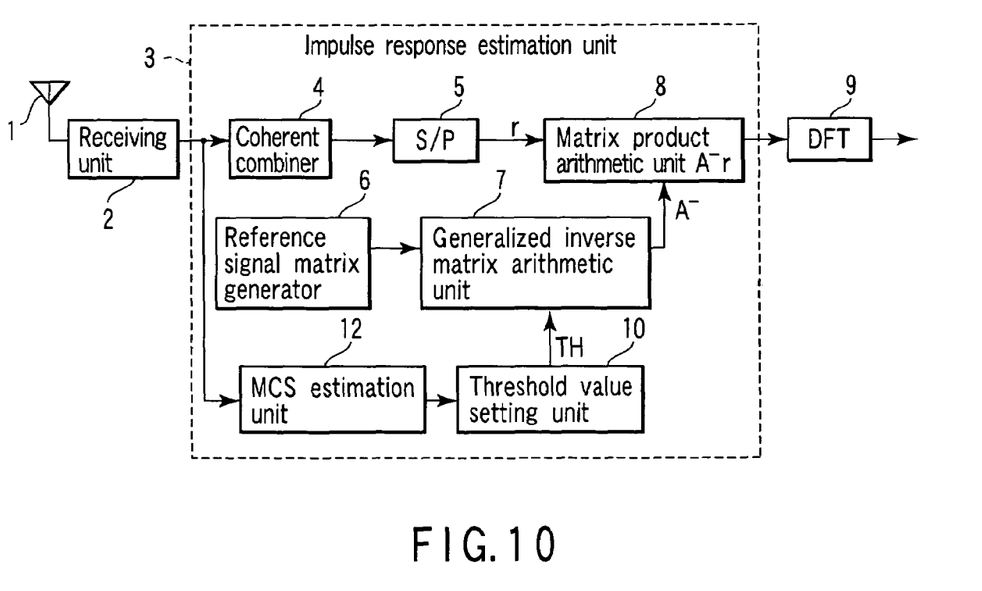
FIG. 10 is a block diagram illustrating a channel response estimation unit according to a third embodiment of the invention.

As seen from FIG. 10, in a third embodiment of the invention, the channel response estimation unit employs an MCS estimation unit 12 instead of the CNR measuring unit 11 shown in FIG. 9. The MCS estimation unit 12 estimates a modulation and coding scheme (MCS) employed for radio communication, based on a received signal output from the receiving unit 2. In accordance with the estimated MCS, the threshold value setting unit 10 sets threshold value TH used by the generalized inverse matrix arithmetic unit 7.

In general, in a system that performs communication with MCS appropriately varied, different CNRs are employed between different MCSs. For example, a modulation scheme that uses s large multi-value modulation number is used in an environment in which CNR is high, while a modulation scheme that uses a small multi-value modulation number is used in an environment in which CNR is low. The same can be said of an encoding scheme. An encoding scheme of a high encoding rate is used in a high-CNR environment, and an encoding scheme of a low encoding ratio is used in a low-CNR environment. From this, it is expected that when communication is performed with a modulation scheme that uses a large multi-value modulation number, CNR is generally high.

In light of this, in the embodiment, threshold value TH can be set to an optimal value according to the environment of the channel simply by changing threshold value TH by the threshold value setting unit 10 in accordance with MCS, without measuring the power of received signals or noise power as in the second embodiment.

Fourth Embodiment

Figure 11:
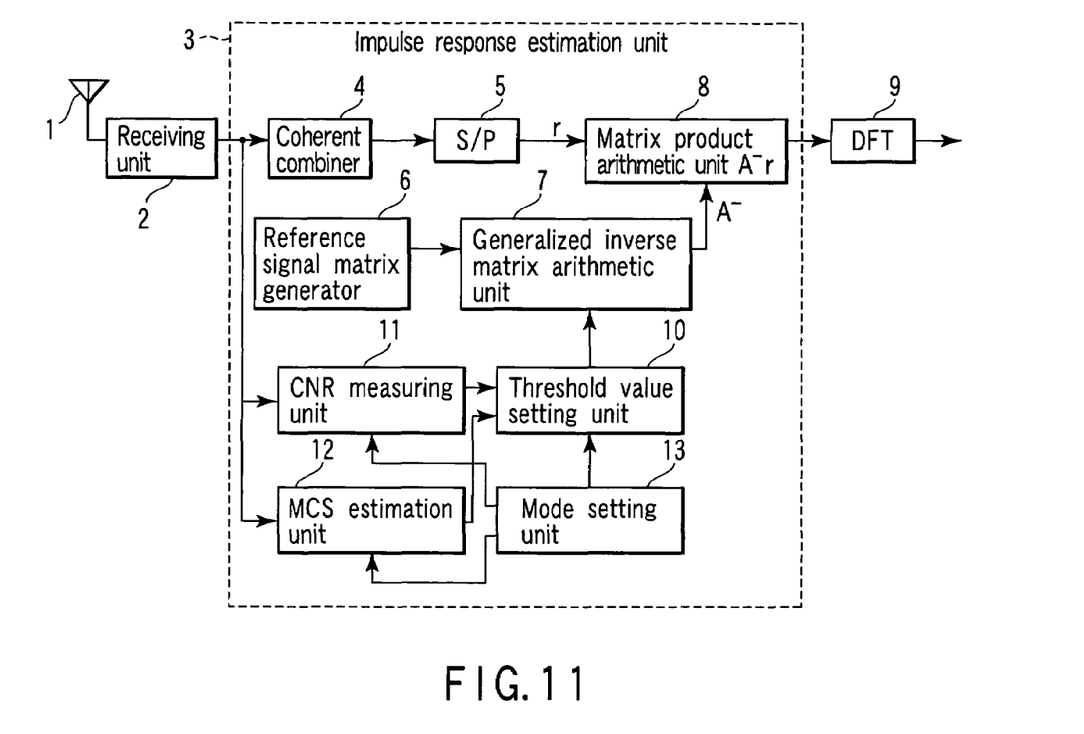
FIG. 11 is a block diagram illustrating a channel response estimation unit according to a fourth embodiment of the invention.

The optimization of threshold value TH may be performed by combining the manner of changing TH in accordance with CNR and the manner of changing TH in accordance with MCS. FIG. 11 shows a channel estimation unit according to a fourth embodiment of the invention. As shown, the estimation unit comprises a threshold value setting unit 10, CNR measuring unit 11, MCS estimation unit 12 and mode setting unit 13. The mode setting unit 13 sets one of first and second modes in accordance with, for example, an instruction from a user, the first mode being a mode in which threshold value TH is changed in accordance with CNR, the second mode being a mode in which threshold value TH is changed in accordance with MCS. In accordance with the set mode, the CNR measuring unit 11 or MCS estimation unit 12 is activated, and the threshold value setting unit 10 based on CNR or MCS.

Figure 12:
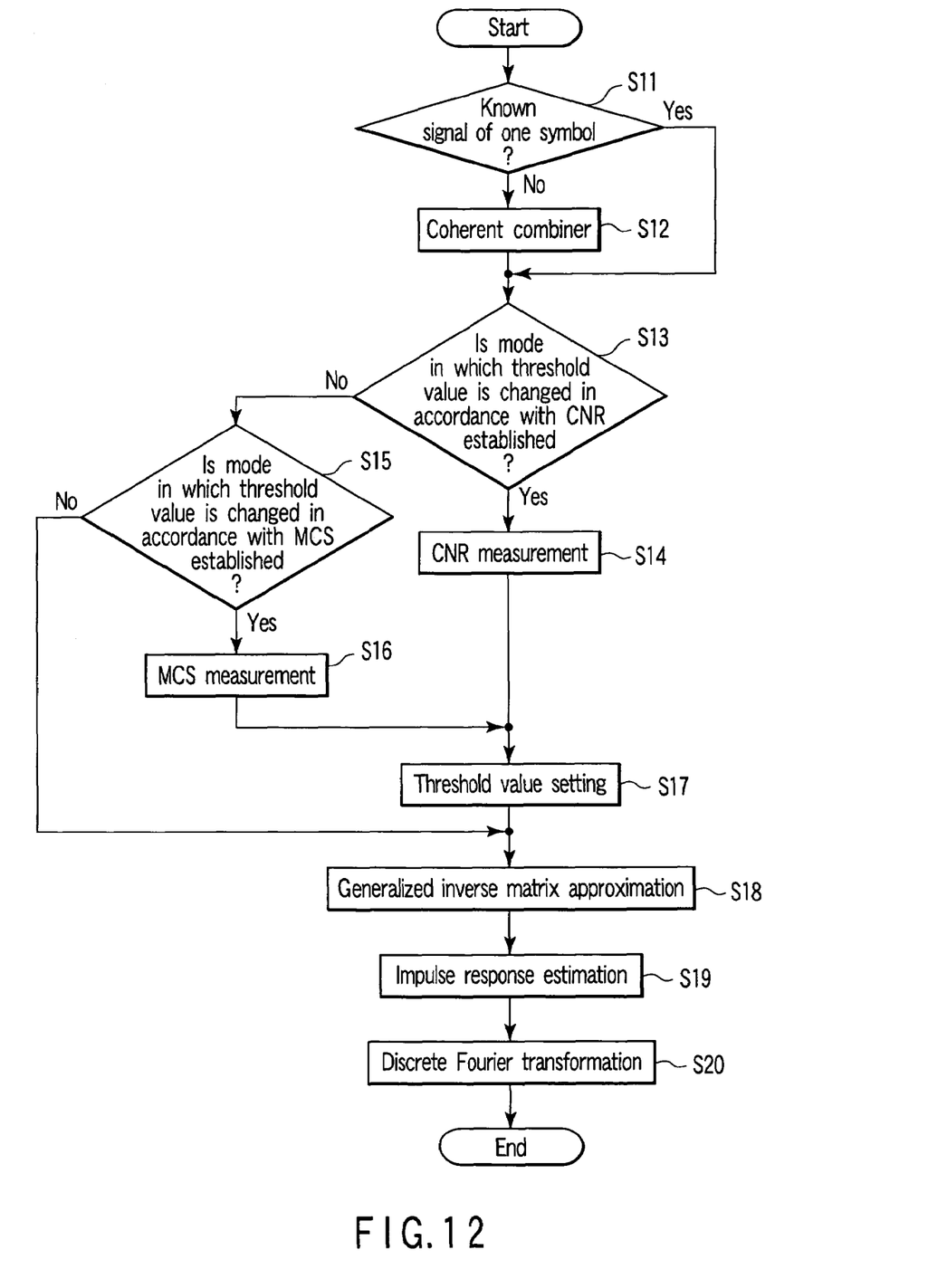
FIG. 12 is a flowchart illustrating the processing procedure of the channel response estimation unit of FIG. 11.

Referring now to FIG. 12, the procedure of estimation of the propagation response in the embodiment will be described. Firstly, it is determined whether the received known signal (OFDM signal) for channel response estimation is of one symbol (step S11). If the known signal is of one symbol, the program jumps to step S13, whereas if the known signal is not of one symbol, coherent combining is performed (step S12) and then the program proceeds to step S13. At step S13, it is determined whether the first mode in which threshold value TH is changed in accordance with CNR. If it is determined that the first mode is set, CNR is measured (step S14), thereby setting threshold value TH in accordance with the measured CNR (step S17).

On the other hand, if the first mode is not set, it is determined whether the second mode in which threshold value TH is changed in accordance with MCS (step S15). If it is determined that the second mode is set, MCS is estimated (step S16), thereby setting threshold value TH in accordance with the estimated MCS (step S17).

After determining threshold value TH, approximation of a generalized inverse matrix is performed without using a singular value lower than threshold value TH (step S18). If it is determined at step S15 that the second mode is not set, i.e., if neither the first mode nor the second mode is set, the program jumps over step S17 to step S18, where approximation of a generalized inverse matrix is performed, as expressed in equation (8), using threshold value TH set as a default at present.

Subsequently, the approximated generalized inverse matrix as expressed in equation (8) is substituted into equation (5), thereby acquiring the impulse response $\underline{h}$ (step S19). Lastly, the acquired impulse response $\underline{h}$ is subjected to DFT (step S20), thereby acquiring a frequency transfer function.

As described above, in the embodiment, threshold value TH is set based on parameter CNR or MCS selected by a user, thereby approximating a generalized inverse matrix using the set threshold value.

Fifth Embodiment

A fifth embodiment of the invention differs from the first embodiment in that in the former, the OFDM transmitter performs space multiplexing, and a plurality of transmission antennas transmit OFDM signals. When transmitting OFDM signals using space multiplexing, it is necessary to estimate the frequency transfer function of each channel and at least one receiving antenna of an OFDM receiver.

Figure 13A:
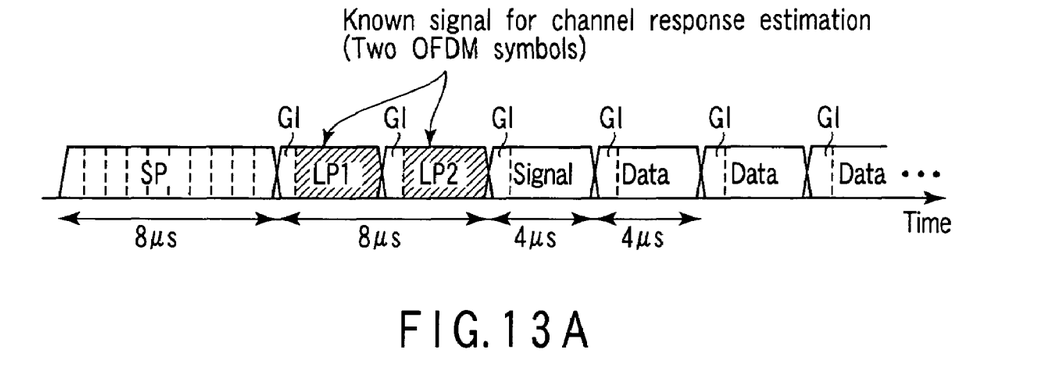
FIGS. 13A and 13B are transmission frame format examples of an OFDM signal used in a fifth embodiment.
Figure 13B:
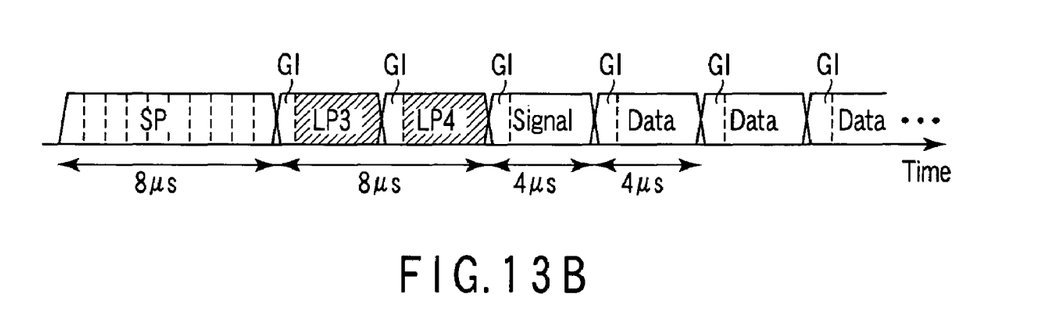

FIGS. 13A and 13B illustrate frame format examples of respective OFDM signals transmitted from two transmission antennas. These formats are basically similar to the format shown in FIG. 7. Specifically, in FIG. 13A, two OFDM symbols LP1 and LP2 are included in a known signal for channel response estimation. Similarly, in FIG. 13B, two OFDM symbols LP3 and LP4 are included in a known signal for channel response estimation.

The sequence composed of OFDM symbols LP1 and LP2 shown in FIG. 13A is orthogonal to the sequence composed of OFDM symbols LP3 and LP4 shown in FIG. 13B. Therefore, even if known signals for channel response estimation sent from the transmission antennas are mixed when they are received, they can be discriminated from each other. As a result, the known signals separated in the code domain can be dealt with as in the first embodiment. This enables the frequency transfer function of the channel between each transmission antenna and the receiving antenna to be estimated as in the first embodiment.

The OFDM symbols LP1 and LP2 shown in FIG. 13A and the OFDM symbols LP3 and LP4 shown in FIG. 13B may not be orthogonal to each other in the code domain. In this case, however, the responses of the channels between the transmission antennas and receiving antenna cannot be individually estimated. Therefore, it is necessary to simultaneously estimate the responses of the channels. To this end, the impulse response $\underline{h}$ of each channel and reference signal matrix A are expanded as follows:

$$h = [h_0^{(1)}, h_1^{(1)}, h_2^{(1)}, \ldots, h_{L-1}^{(1)}, h_0^{(2)}, h_1^{(2)}, h_2^{(2)}, \ldots, h_{L-1}^{(2)}]^T \qquad (9)$$

$$A = \begin{bmatrix} p_1(0) & p_1(M-1) & \cdots & p_1(M-L+1) & p_2(0) & p_2(M-1) & \cdots & p_2(M-L+1) \\ p_1(1) & p_1(0) & & p_1(M-L+2) & p_2(1) & p_2(0) & & p_2(M-L+2) \\ \vdots & \vdots & \ddots & \vdots & \vdots & \vdots & \ddots & \vdots \\ p_1(M-1) & p_1(M-2) & & p_1(M-L) & p_2(M-1) & p_2(M-2) & & p_2(M-L) \end{bmatrix}$$

where $h^{(1)}$ represents the impulse response of the channel between the first antenna and the OFDM receiver, and $h^{(2)}$ the impulse response of the channel between the second antenna and the OFDM receiver. Further, $p_1(n)$ represents a known signal for channel response estimation transmitted from the first antenna, and $p_2(n)$ represents a known signal for channel response estimation transmitted from the second antenna.

The use of the impulse response $\underline{h}$ and reference signal matrix A as shown in formula (9) enables the respective impulse responses of the channels between the transmission antennas and OFDM receiver to be acquired simultaneously. Based on the acquired impulse responses, the frequency transfer function of each channel can be estimated. Thus, when OFDM signals are transmitted from a plurality of transmission antennas using space multiplexing, even if the known signals used for channel response estimation are not orthogonal to each other, the frequency transfer function of the channel between each transmission antenna and an OFDM receiver can be estimated.

The present invention enables even an OFDM radio communication system, in which all subcarriers in the bandwidth range cannot be used, to accurately estimate a frequency transfer function as a channel response, and to accurately demodulate a received OFDM signal using the estimated frequency transfer function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for estimating a channel response using a received OFDM signal, the method comprising:
   generating a reference signal matrix in accordance with a prepared known signal for channel response estimation;
   calculating a generalized inverse matrix of the reference signal matrix including singular values which exceed preset threshold value;
   estimating an impulse response of a channel modeled using a transversal filter based on a known signal included in the received signal and the generalized inverse matrix; and converting the estimated impulse response into a frequency-domain signal to acquire a frequency transfer function of the channel, wherein the generalized inverse matrix is given by $$(A^H A)^{-1} A^H = \sum_{i=1}^{L-k} \frac{1}{\lambda_i} \cdot v_i w_i^H$$

where A is the reference signal matrix, $(A^H A)^{-1} A^H$ is the generalized inverse matrix, $\lambda_i$ is the singular value of the reference signal matrix A, $w_i$ is the M-dimensional singular vectors, $v_i$ is the L-dimensional singular vectors, M is the number of subcarriers of the OFDM signal, L is the number of paths included in the modeled channel, k is the positive integer higher than 0 and lower than L.

2. The method according to claim 1, further comprising:
measuring a carrier-to-noise ratio of the received signal; and
setting the threshold value based on the carrier-to-noise ratio.

3. The method according to claim 1, further comprising:
estimating a modulation and coding scheme of the received signal; and
setting the threshold value based on the estimated modulation and coding scheme.

4. The method according to claim 1, further comprising:
measuring a carrier-to-noise ratio of the received signal;
estimating a modulation and coding scheme of the received signal; and
setting the threshold value based on a selected one of the measured carrier-to-noise ratio of the received signal and the estimated modulation and coding scheme.

5. An apparatus for estimating a channel response using a received OFDM signal, the apparatus comprising:
a generator which generates a reference signal matrix in accordance with a prepared known signal for a channel response estimation;
a calculator which calculates a generalized inverse matrix of the reference signal matrix including singular values which exceed a preset threshold value;
an estimation unit configured to estimate an impulse response of a channel modeled using a transversal filter based on a first known signal included in the received signal and the generalized inverse matrix; and
a converter which converts the estimated impulse response into a frequency-domain signal to acquire a frequency transfer function of the channel, wherein the generalized inverse matrix is given by $$(A^H A)^{-1} A^H = \sum_{i=1}^{L-k} \frac{1}{\lambda_i} \cdot v_i w_i^H$$

where A is the reference signal matrix, $(A^H A)^{-1} A^H$ is the generalized inverse matrix, $\lambda_i$ is the singular value of the reference signal matrix A, $w_i$ is the M-dimensional singular vectors, $v_i$ is the L-dimensional singular vectors, M is the number of subcarriers of the OFDM signal, L is the number of paths included in the modeled channel, k is the positive integer higher than 0 and lower than L.

6. The apparatus according to claim 5, further comprising:
a measuring unit configured to measure a carrier-to-noise ratio of the received signal; and
a setting unit configured to set the threshold value based on the carrier-to-noise ratio.

7. The apparatus according to claim 5, further comprising:
an estimating unit configured to estimate a modulation and coding scheme of the received signal; and
a setting unit configured to set the threshold value based on the estimated modulation and coding scheme.

8. The apparatus according to claim 5, further comprising:
a measuring unit configured to measure a carrier to-noise ratio of the received signal;
an estimating unit configured to estimate a modulation and coding scheme of the received signal; and
a setting unit configured to set the threshold value based on selected one of the measured carrier-to-noise ratio of the received signal and the estimated modulation and coding scheme.

9. A receiver apparatus for use in an OFDM radio communication system, comprising:
a receiving unit which receives an OFDM signal of the RF band and generates a received signal including a first known signal;
a generator which generates a reference signal matrix in accordance with a prepared known signal for a channel response estimation;
a calculator which calculates a generalized inverse matrix of the reference signal matrix including singular values which exceed a preset threshold value;
an estimation unit configured to estimate an impulse response of a channel modeled using a transversal filter based on the first known signal and the generalized inverse matrix;
a converter which converts the estimated impulse response into a frequency-domain signal to acquire a frequency transfer function of the channel; and
a demodulator which demodulates the received signal based on the frequency transfer function, wherein the generalized inverse matrix is given by $$(_A H_A) - 1_A H = \sum_{i=1}^{L-k} \frac{1}{\lambda_i} \cdot v_i w_i^H$$

where A is the reference signal matrix, $(A^H A)^{-1} A^H$ is the generalized inverse matrix, $\lambda_i$ is the singular value of the reference signal matrix A, $w_i$ is the M-dimensional singular vectors, $v_i$ is the L-dimensional singular vectors, M is the number of subcarriers of the OFDM signal, L is the number of paths included in the modeled channel, k is the positive integer higher than 0 and lower than L.

* * * * *